United States Patent

Bridges et al.

[15] 3,644,846
[45] Feb. 22, 1972

[54] OPTICAL MODULATION BY SUBMILLIMETER-WAVE SIGNALS AND APPLICATIONS THEREOF

[72] Inventors: Thomas James Bridges, Holmdel; Ivan Paul Kaminow, New Shrewsbury; Martin Alan Pollack, Colts Neck, all of N.J.

[73] Assignee: Bell Telephone Laboratories, Incorporated, Murray Hill, N.J.

[22] Filed: May 4, 1970

[21] Appl. No.: 34,198

[52] U.S. Cl. ............................................332/7.51, 250/199
[51] Int. Cl. ...........................................................H01s 3/10
[58] Field of Search..................330/4.3; 332/7.51; 250/199; 350/160 P

[56] References Cited

UNITED STATES PATENTS

| | | | |
|---|---|---|---|
| 3,555,455 | 1/1971 | Paine | 332/7.51 |
| 3,492,492 | 1/1970 | Ballman | 250/199 |
| 3,413,476 | 11/1968 | Gordon | 332/7.51 |

OTHER PUBLICATIONS

Boyd, " Up– Conversion of 10.6u Radiation to the Visible" Pg. 515– 519, QE. QE– 4, No. 9, 9/68.

Frenkel, " Methods for the Measurement of $\gamma$ and Stability of...in the I.R." Pg. 883, E & E abstracts, No. 15359 9/69.

*Primary Examiner*—Rodney D. Bennett, Jr.
*Assistant Examiner*—N. Moskowitz
*Attorney*—R. J. Guenther and Arthur J. Torsiglieri

[57] ABSTRACT

A continuous-wave cyanide (HCN) laser has been employed to drive a continuous, traveling-wave lithium niobate (LiNbO$_3$) electro-optic modulator at signal frequencies of 964 gHz. (311 $\mu$m.) and at 891 gHz. (337 $\mu$m.). Part of the power of a visible 0.633-$\mu$m. carrier beam is converted into two visible sidebands, one of which is favored by the choice of phase-matching angle. In a submillimeter communication system and in power metering of submillimeter radiation, angular separation of the beams makes attractive the up-conversion to the visible region, followed by detection. The large frequency separation of the visible carrier and the sidebands facilitates precision spectroscopic and metrological applications.

6 Claims, 5 Drawing Figures

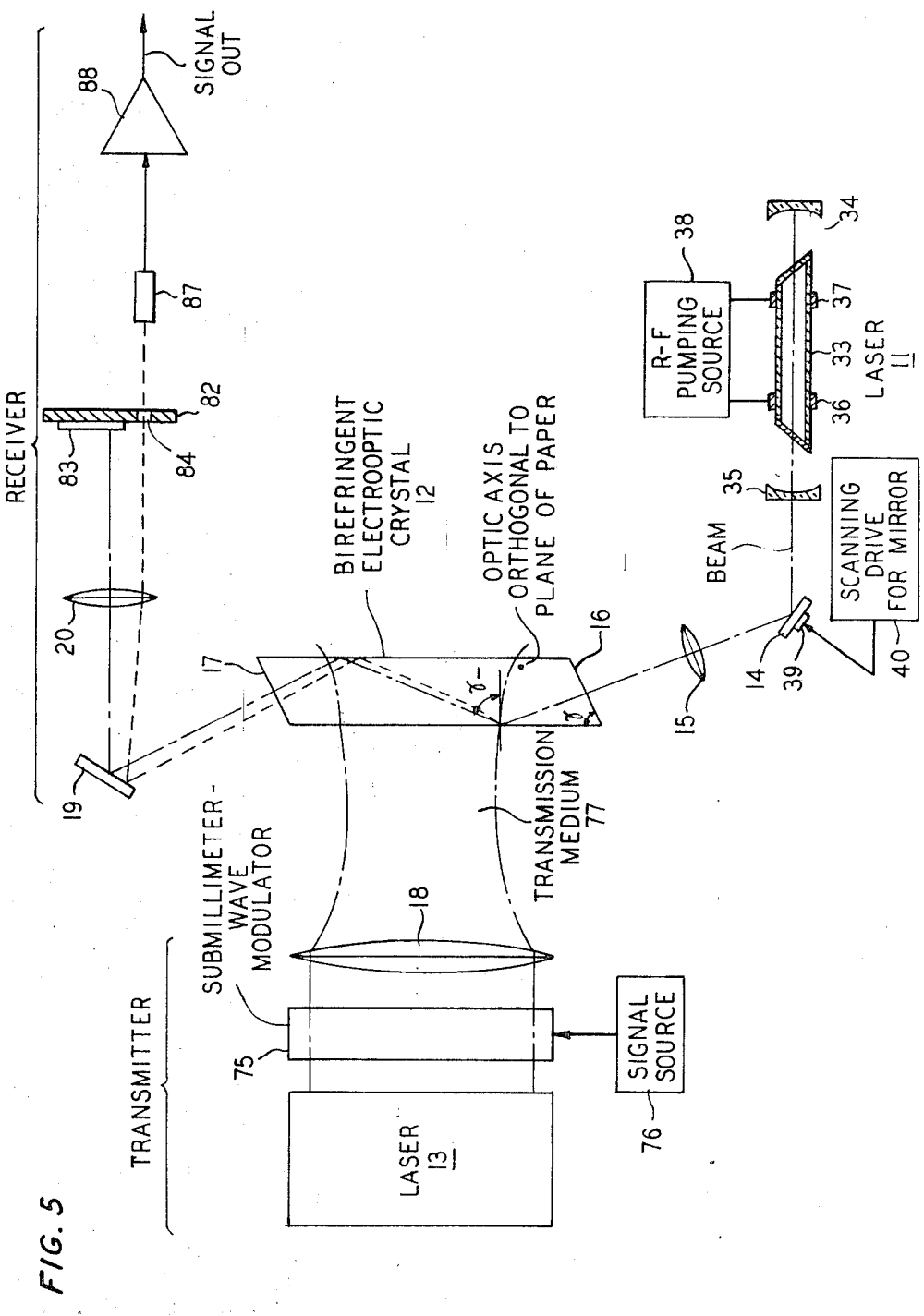

OPTICAL MODULATION BY SUBMILLIMETER-WAVE SIGNALS AND APPLICATIONS THEREOF

BACKGROUND OF THE INVENTION

This invention relates to optical modulators, particularly those in which the modulating signal is in the submillimeter range.

An optical modulator is a modulator in which a beam of near infrared, visible or ultraviolet electromagnetic radiation is caused to vary in some detectable way in response to a modulating signal, typically an information-bearing signal. The submillimeter range is the range from 300 gHz. to 3,000 gHz. (1,000 zm. to 100 zm. wavelength).

While wideband modulation of optical beams by microwave signals guided by a waveguide has heretofore been proposed in an article by one of us (Mr. Kaminow), with Mr. W. W. Rigrod, in the *Proceedings of the IEEE*, 51, 1 (Jan., 1963), this technique has not been successfully applied when the modulating signal is in the submillimeter range.

Moreover, since submillimeter wave sources are relatively few and weak and detectors are relatively slow and insensitive, this region of the spectrum has been relatively forbidding with respect to practical application. Nevertheless, if these problems could be overcome, submillimeter waves could become attractive for communication systems of greater capacity than microwave-waveguide systems.

SUMMARY OF THE INVENTION

Our invention is based upon the discovery of effective optical modulation driven by a freely propagating coherent submillimeter-wave signal beam in a birefringent electro-optic crystal. No signal electrodes and no guiding structure are required.

More specifically, our discovery includes the first modulation of a visible coherent light beam by a freely-propagating beam from a submillimeter-wave laser. In out experiments, the submillimeter-wave laser is a hydrogen cyanide (HCN) laser employed to drive a traveling-wave lithium niobate (LiNbO$_3$) electro-optic modulator continuously at signal frequencies of 964 gHz. (311 μm.) and 891 gHz. (337 μm.) to convert part of the power of a 0.633-μm. visible laser beam into two visible sidebands, one of which is favored by the choice of phase-matching angle.

According to our invention, a coherent carrier beam in the optical range is modulated in a birefringent electro-optic crystal by a freely propagating submillimeter-wave beam at a phase-matching angle sufficiently large to make the optical carrier and both optical sidebands optically resolvable on account of their angular divergence.

According to first and second features of our invention, the angular divergence of optical carrier and sidebands is employed, respectively, in up-conversion followed by visible-optical detection of a modulation first imposed upon the submillimeter-wave beam and in power metering of submillimeter-wave radiation.

Advantageously, the large frequency separation of the visible carrier and the sidebands facilitates precision spectroscopic and metrological applications. Metrology is the science of measurement.

BRIEF DESCRIPTION OF THE DRAWING

Further features and advantages of our invention will become apparent from the following detailed description, taken together with the drawing, in which:

FIG. 5 is a partially pictorial and partially block diagrammatic illustration of a communication system employing the invention in a receiver.

DESCRIPTION OF ILLUSTRATIVE EMBODIMENTS

Figure 1:
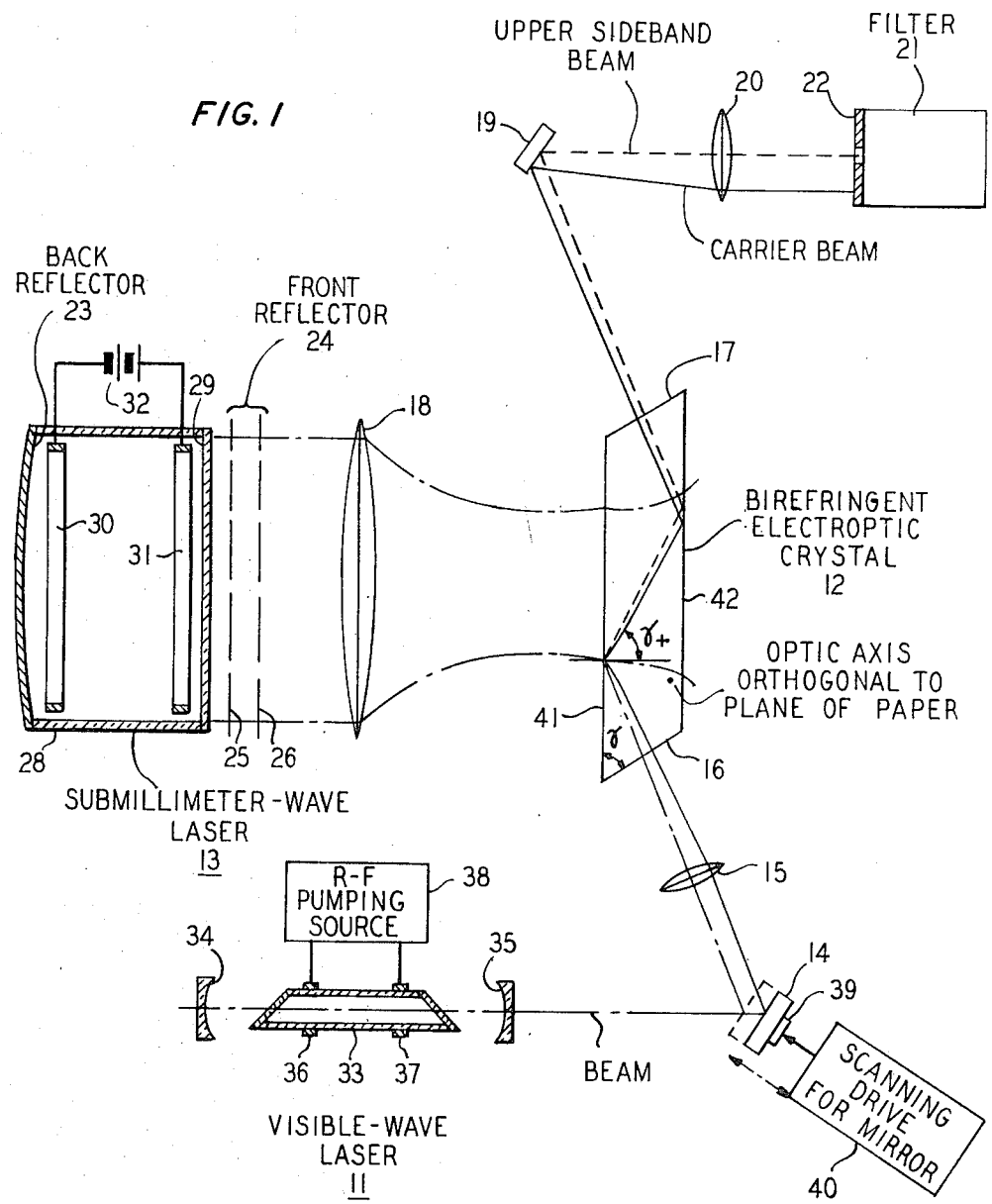
FIG. 1 is a partially pictorial and partially block diagrammatic illustration of a modulator embodiment of the invention.

In the embodiment of FIG. 1, it is desired to modulate a 0.633-μm. visible laser beam from the helium-neon laser 11 with a submillimeter-wave laser beam from the submillimeter-wave cyanide laser 13 to obtain a visible sideband beam that is selected and passed to the output by a filter 21. The resulting beam is useful in that it is shifted in frequency from that of the 0.633-μm. beam by the frequency of the submillimeter-wave beam and also has any amplitude modulation or other modulation present on the submillimeter-wave beam. A photomultiplier can then provide rapid, sensitive detection of this sideband whereas no comparable direct-detection equipment for submillimeter waves presently exists.

The modulation is accomplished in the birefringent electro-optic crystal 12, which is illustratively a lithium niobate (LiNbO$_3$) single crystal having its optic axis normal to the plane of intersection of the 0.633-μm. beam and the submillimeter-wave beam.

The 0.633-μm. beam from laser 11 is directed through crystal surface 16, illustratively substantially normal thereto, by reflector 14 and lens 15 disposed between laser 11 and crystal 12.

The submillimeter-wave beam from laser 13 is directed through crystal surface 41, illustratively substantially normal thereto, by lens 18.

The angle γ between crystal faces 16 and 41 is chosen to satisfy the simultaneous conditions (1) that the 0.633-μm. visible carrier beam is internally reflected at surface 41, and also at the parallel surface 42, and (2) that the 0.633-μm. beam and the submillimeter-wave beam throughout their region of intersection, are substantially phase-matched to, for example, the upper sideband visible beam.

When both input beams are orthogonal to their entry surfaces, it can be shown from the law of reflection and principles of geometry that the angle between the directions of propagation of the input beams in their region of intersection is also approximately γ. Since in this instance they are phase-matched to the upper sideband, this angle will be called γ+. If the lower sideband beam were phase-matched to the input beams, this angle would be termed γ−.

The 0.633-μm. carrier beam and the phase-matched sideband beam are extracted through surface 17, which is parallel to surface 16, and are directed by reflector 19 and lens 20 through a narrow-passband filter 21 for selecting the upper sideband for further transmission to the eventual utilization apparatus (not shown).

In order to phase-match the lower sideband to the input beams, reflector 14 is driven by piezoelectric element 39 mounted thereon, and an electrical scanning drive source 40, to change the angle of propagation of the 0.633-μm. beam through lens 15 and surface 16. A pure translation of reflector 14 displaces the beam from the center of lens 15 and changes its angle of propagation with respect to the axis of the lens. Alternatively, a mechanical scanning drive source 40 could move reflector 14 directly.

The 0.633-μm. helium-neon laser 11 is of conventional type supplying a 15-milliwatt beam focused to a waist of about $4 \times 10^{-3}$ centimeters diameter in the region of intersection with the beam from laser 13.

The lithium niobate crystal 12 has a thickness $t$ between surfaces 41 and 42, where $t^{-1} \approx \alpha_3$ and $\alpha_3$ is the absorption coefficient of the crystal in the submillimeter range for fields polarized along the optic axis. The length of crystal 12 along either surface 41 or 42 is $w$, where $w$ illustratively is 3.68 millimeters.

The submillimeter-wave hydrogen cyanide laser 13 comprises an active medium of hydrogen cyanide gas in a suitable tube 28, 3 meters long, including the gold-coated back reflector 23, the polyethylene end window 29 and the mesh-front reflector 24, which is about 98 percent reflective and about 2 percent transmissive, for the submillimeter-wave stimulated radiation. The laser pumping apparatus includes the cathode 30, the anode 31 and the direct current voltage source 32 connected in series for establishing a discharge between electrodes 30 and 31 to excite the hydrogen cyanide gas.

The front reflector 24 illustratively includes the two meshes 25 and 26 fabricated and spaced to form a highly reflective (about 98 percent) submillimeter interference filter. The mesh wires are 19-$\mu$m. wide copper wires on 102-$\mu$m. centers in a square array. The spacing of the meshes 25 and 26 illustratively is approximately 167 $\mu$m., and is finely adjusted during fabrication or during laser operation to obtain reflectivity and transmissivity in the desired proportions.

The diameter of tube 28 is approximately 3 inches; and 20-centimeter lens 18 focuses the submillimeter-wave beam to a waist of approximately 1.9-mm. diameter between its half-power points in the vicinity of surface 41 of crystal 12.

Illustratively, the filter 21 can include an input member 22 having a slit or aperture through which the selected beam passes. Such an input member is advantageous because of the angular divergence among all three of the carrier beam and the sideband beams.

In the operation of the embodiment of FIG. 1, submillimeter-wave laser 13 illustratively supplies about ½ watt at either 964 gHz. (311 $\mu$m.) or 891 gHz. (337 $\mu$m.).

A 10-db. attenuator (not shown) may be introduced at the output of laser 13 to isolate it from crystal and lens reflections.

The upper sideband is illustratively phase matched by driving reflector 14 until the upper sideband is detectable at the output of filter 21. This upper sideband beam propagates at a somewhat greater angle with respect to the normal to surface 41 than the angle $\gamma+$, the angle of propagation of the carrier beam.

Alternatively, if the lower sideband beam is phase matched by driving reflector 14 until that sideband is passed by filter 21, that sideband will propagate at a smaller angle with respect to the normal of surface 41 than the angle $\gamma-$ (not shown), which is the angle of propagation of the carrier beam under those conditions. It will be recalled that the carrier beam will not be normal to surface 16 during at least one of these regimes and that the position of reflector 14 and the focusing properties of lens 15 determine this angle.

The modulation characteristics of the embodiment of FIG. 1 can be described as follows.

Figure 2:
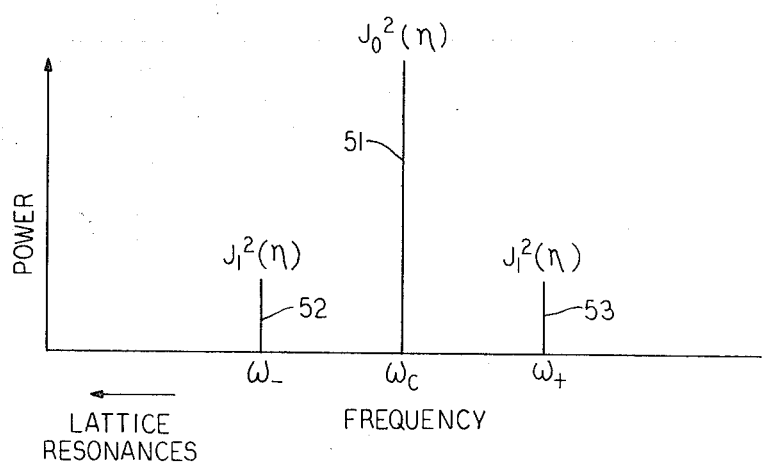
FIGS. 2 and 3 show relationships pertinent to the operation of all of the embodiments of the invention.

Utilizing the $r_{33}$ electro-optic coefficient in LiNbO$_3$, i.e., both the visible carrier and submillimeter-wave modulating waves polarized along the c-axis, the phase modulation index is $$\eta = \frac{\pi n_3^3 r_{33}}{\lambda_c} \int E_m(l) dl. \qquad (1)$$

with $n_3$ the extraordinary refractive index at carrier wavelength $\lambda_c$, $E_m$ the peak modulating field, and $l$ the path of the carrier along which the integral is taken. The ratio R of power in each first sideband to power in the carrier for a phase modulated signal is $$R = \frac{J_1^2(\eta)}{J_0^2(\eta)} \approx \tfrac{1}{4}\eta^2 \qquad (2)$$

for small $\eta$, with $J_n(\eta)$ the $n$th order Bessel function. The sideband spectrum is illustrated in FIG. 2.

Figure 3:
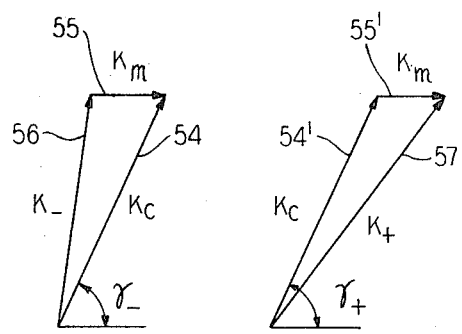

Phase velocities of the interacting waves must be matched over the path $l$ specified in Equation (1) for each sideband frequency $\omega$ separately, $$\vec{k}_\cdot = \vec{k}_c \pm \vec{k}_m, \quad \omega_\cdot = \omega_c \pm \omega_m, \qquad (3)$$

where $k$ is the wavevector. If the angle between $k_c$ and $k_m$ is $\gamma$ for each sideband, as in FIG. 3, then $$\cos \gamma_\pm = \frac{n_3}{\epsilon_3^{1/2}} \left[ 1 \pm \frac{(\epsilon_3 - n_3^2)}{2n_3^2} \frac{\omega_m}{\omega_c} \right] \approx n_3/\epsilon_3^{1/2} = \cos \gamma. \qquad (4)$$

for $\omega_m/\omega_c$ small, with $\epsilon_3$ the dielectric constant along the c-axis at $\omega_m$, and $\gamma \approx \gamma$. Taking $\epsilon_3=27$ and $n_3=2.20$ yields $\gamma=65°$ and $(\gamma_- - \gamma_+)=0.51°$. If the matching condition is not exactly satisfied, then Equation (1) is reduced by a (sin $x/x$) factor that has its first zero when the angular deviation is $$\delta\gamma = \pm \frac{\lambda_m}{l_1(\epsilon_3 - n_3^2)^{1/2}}. \qquad (5)$$

For total effective pathlength $l_T=2$ mm., as in our case, $\delta\gamma \approx \pm 2°$. The sidebands have typically been observed with a reference chopper (not shown) before lens 18 and the carrier with a chopper (not shown) before reflector 14. Sideband ratio R is measured by inserting calibrated attenuators into the 0.633-$\mu$m. beam and $\eta$ is determined from Equation (2).

The phase-matched modulation index and sideband ratio can be calculated from the distribution of $E_m(l)$ along the optical path. For a fundamental Gaussian beam propagating along the z-axis, the field at the waist varies as $$e^{-\left(\frac{r}{w_0}\right)^2}$$

in the radial direction, with $w_o=1.6$ mm. The field decays as $$e^{-\tfrac{1}{2}\alpha_3 z}$$

with $\alpha_3=11$ cm.$^{-1}$. Because of surface reflections, the modulating power P entering the crystal is TP$_{IN}$, with T=0.54 and P$_{IN}$ the incident power. The field at $z=0$, $r=0$ is $$E_m(0) = \left[\frac{4z_0 T P_{IN}}{\pi \epsilon_3^{1/2} w_0^2}\right]^{1/2}, \qquad (6)$$

where $z_0=377$ ohm. According to Equation (6), $E_m(0)=440$ P$_{IN}^{1/2}$ v/m with P$_{IN}$ in watts. Since $\alpha_3 t=0.95$, multiple reflections can be neglected. Note that adjacent segments of the optical beam path are not modulated because the matching condition is not satisfied. After some manipulation the integral in Equation (1) becomes $9.6\times10^{-4} E_m(0)$ volts. For comparison, the optical path length $l_T$ is $20\times10^{-4}$m. Then, with the radiofrequency electro-optic coefficient $r_{33}=31\times10^{-12}$ m/v, the calculated $\eta$ and R are $$\eta = 7.0 \times 10^{-3} P_{IN}^{1/2} \text{ (rad)}$$
$$R = 1.2 \times 10^{-5} P_{IN} \qquad (7)$$

Repeated sideband ratio measurements with P$_{IN}\approx 0.1$ W give $$R = (0.7 \pm 0.3) \times 10^{-5} P_{IN} \qquad (8)$$

at either 964 or 891 gHz. The good agreement confirms the invariance of $r_{33}$ up to 964 gHz. The chief experimental uncertainties arise from measurement of P$_{IN}$ ( 50 percent) with an Eppley thermopile having a reflection coefficient of 90 percent at 337 $\mu$m., and from measurement of optical attenuation at 0.633 $\mu$m. ( 20 percent). The angles predicted in Equations (4) and (5) were found to be $\gamma=63°$, $\gamma_- - \gamma_+=0.4°$ and $\delta\gamma=1°$. These are internal angles that have been corrected for refraction at the surface. The observed $\gamma$, which is significantly smaller than the calculated value, implies $\epsilon_3 \approx 24$ if $n_3 = 2.2$.

Operating characteristics of the device at other carrier and modulation frequencies can be determined by considering the wavelength dependence in Equation (1) as well as dispersion in $\alpha_3$, $\epsilon_3$, and $n_3$.

The foregoing measurements of sideband ratio suggest a technique for power-metering submillimeter-wave radiation more sensitively and more rapidly than heretofore possible. A modified embodiment for this purpose is illustrated in FIG. 4.

Figure 4:
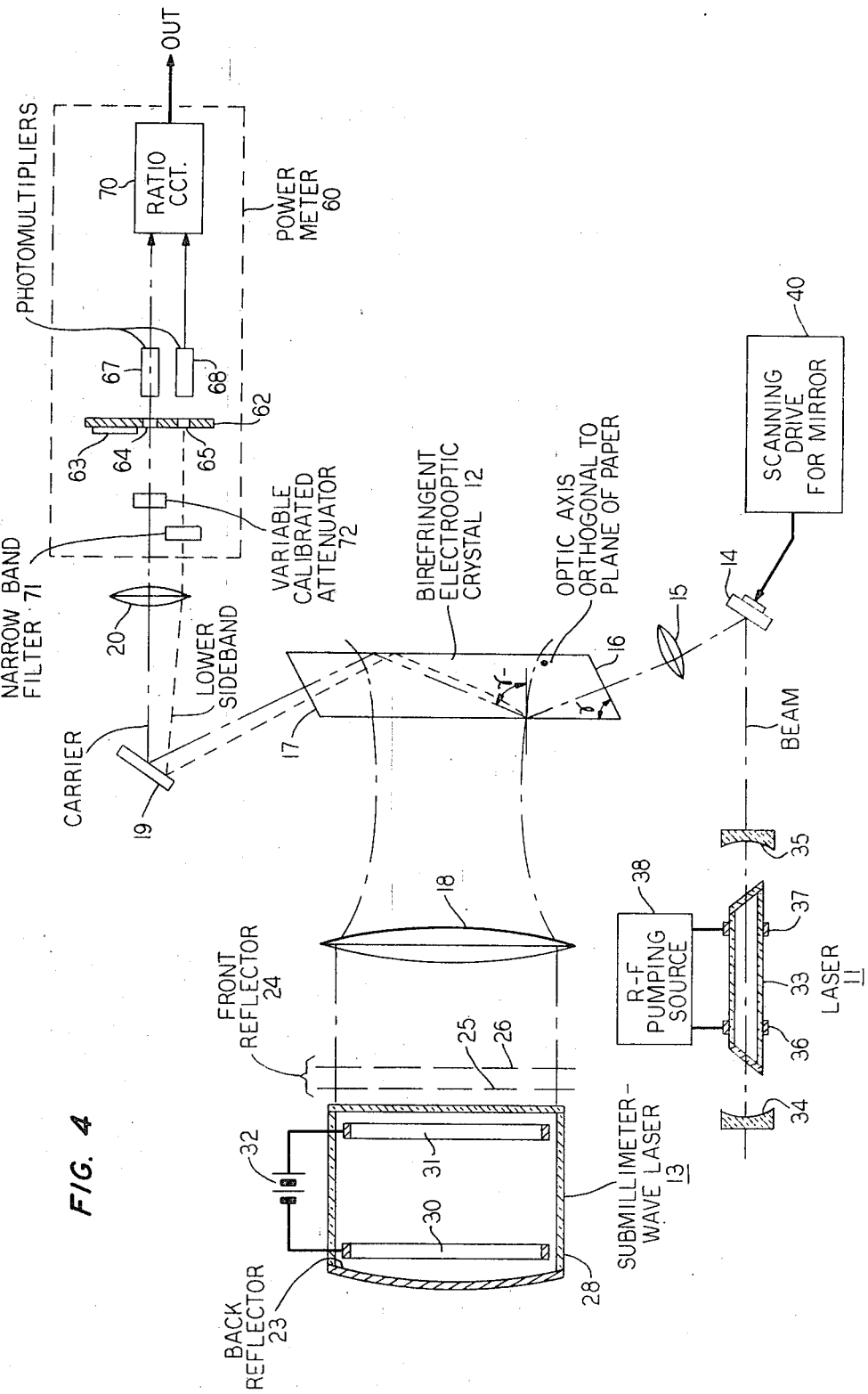
FIG. 4 is a partially pictorial and partially block diagrammatic illustration of a power-metering embodiment of the invention.

In FIG. 4, components numbered the same as in FIG. 1 are substantially the same as those components of FIG. 1.

The principal change in the embodiment of FIG. 4, as compared to the embodiment of FIG. 1, is that filter 21 is replaced by the assembly 60 designated a "power meter." Power meter 60 includes the filter 71 which passes only the sideband frequency and rejects any carrier light that might have been scattered into that path. It further includes the calibrated variable attenuator 72, illustratively a rotatable polarizer disposed between fixed polarizers, and the slit device 62 having slits disposed for resolution of the angularly separated carrier and sideband beams. The photomultipliers 67 and 68 intercept the light passing through the respective slits and apply their output signals to ratio circuit 70, which is a known type of electronic circuit for indicating the ratio of two slowly varying electrical signals and can illustratively be a so-called bridge circuit.

The attenuator 72 is varied to reduce the carrier power until the ratio indicated by circuit 70 is unity. The submillimeter-wave power is then read directly from calibrated attenuator 72. This measurement can be extremely precise because of the passive nature of attenuator 72.

The slit device 62 can illustratively include an absorber 63 in a position to intercept the other sideband beam, which may be very weakly present despite the lack of phase-matching conditions for it. Absorber 63 reduces scattering of this sideband into the path of the other beams in power meter 60 and correspondingly alleviates the filtering requirements for those beams.

A further modification of the embodiment of FIG. 1 to facilitate its use for up-conversion and detection in the receiver of a communication system is illustrated in FIG. 5. Here again, components numbered the same as in FIG. 1 are substantially the same as described there.

Between front reflector 24 of laser 13 and lens 18 is disposed a modulator 75, which is illustratively a chopper-type modulator or an electromechanical modulator capable of modulating the submillimeter-wave beam at a moderate information rate. As a matter of practical interest, many crystalline phenomena could usefully be studied with the aid of submillimeter-wave radiation and would provide such modulation of scientific interest, particularly in spectroscopy. It is desirable to have sensitive, fast means for detecting this modulation.

Such a detecting means is provided at a receiver separated from lens 18 by a suitable transmission medium 77. The receiver includes laser 11, crystal 12 and associated apparatus, particularly that following lens 20. That modified apparatus includes slit device 82, which passes the lower sideband beam at aperture 84 while rejecting the carrier, illustratively by absorption at absorber 83.

Device 82 is followed by the photomultiplier 87 and output amplifier 88.

In operation, the crystal 12 up-converts the received submillimeter-wave radiation to the visible portion of the spectrum, in which the modulation originally imposed on the submillimeter-wave beam is readily detected by photomultiplier 87.

Especially for the case of an extended transmission medium 77, which could be a guiding structure for submillimeter radiation, it is readily seen that our invention solves one of the problems of future submillimeter communication systems.

Further applications of our invention include refinements in the measurement of the velocity of light because of the submillimeter modulating frequencies that can now be used as a result of our invention. The basic apparatus in which our modulator could be employed for this purpose is disclosed in the article, "Locking a Laser Frequency to the Time Standard," by Z. Bay and G. G. Luther, *Applied Physics Letters*, Vol. 13, page 303 (Nov. 1, 1968). In that article, the problem that higher modulating frequencies are needed is pointed out, without solution.

In that apparatus as well as precision spectroscopic applications and metrological applications, our modulator is useful because of the large frequency separation between carrier and sidebands. The frequency separation can be measured very accurately by mixing a portion of the submillimeter-wave radiation with harmonics of radiofrequency standards by any of several known techniques. One such technique is that disclosed by L. O. Hocker et al., *Applied Physics Letters*, Vol. 10, page 147 (1967).

The following modification of our invention is also within its scope. If $\gamma+$ or $\gamma-$ is less than the angle required for total internal reflection in crystal 12, then the visible carrier beam may be incident on the same face as the modulating beam. The two beams would be incident at angles such that they would be refracted to propagate internally at the relative angle $\gamma+$ or $\gamma-$.

We claim:

1. Optical modulation apparatus of the type comprising a source of a first beam of optical radiation, a birefringent electro-optic crystal passing said first beam in a first direction, said crystal having lattice resonances in the far infrared range between 10 μm. and 100 μm., and means for modulating said first beam at a wavelength longer than 100 μm., said apparatus being characterized in that said modulating means includes a source of a second coherent beam in the submillimeter range between 100 μm. and 1,000 μm. and means for directing said submillimeter coherent beam into said crystal as a freely propagating beam in a second direction making an angle with said first direction providing phase-matched interaction of said beams yielding at least one sideband beam substantially angularly separated and optically resolvable from said first beam.

2. Optical modulation apparatus according to claim 1 in which the birefringent electro-optic crystal is shaped and adapted to pass the first beam in a first direction yielding multiple internal reflections of said first beam, said reflections lengthening said phase-matched interaction, and the modulating means includes means for changing the angle of internal reflection of said first beam within said crystal and means for filtering the optical radiation emerging from said crystal to separate the phase-matched sideband beam from said first beam.

3. Optical modulation apparatus according to claim 2 in which the means for changing the angle of internal reflection is capable of selecting either the upper sideband beam or lower sideband beam for phase-matched interaction with the first and second beams.

4. Optical modulation apparatus of the type comprising a source of a beam of visible optical radiation, a birefringent electro-optic crystal passing said visible beam in a first direction yielding multiple internal reflections and no double refraction of said visible beam, said crystal having lattice resonances in the far infrared range between 10 μm. and 100 μm., and means for modulating said visible beam at a wavelength longer than 100 μm., said apparatus being characterized in that said modulating means includes a source of a coherent beam in the submillimeter range between 100 μm. and 1,000 μm. and means for directing said submillimeter coherent beam into said crystal as a freely propagating beam in a second direction making an angle with said first direction providing phase-matched interaction of said beams yielding two sideband optical beams substantially angularly separated and resolvable from said visible optical beam.

5. Optical modulation apparatus according to claim 1 in which the modulating means includes variable calibrated means for attenuating the portion of the first beam emerging from the crystal and means for deriving the ratio of said one sideband beam to said attenuated portion of the first beam, whereby variation of the attenuating means to yield a fixed ratio yields an indication of submillimeter-wave power level.

6. Optical modulation apparatus according to claim 1 in which the source of the second beam includes means for imparting a modulation to said second beam, the means for directing said second beam includes a transmission medium, the source of the first beam is a source of a visible beam of optical radiation, and the means for modulating the first beam is adapted as an upconverting detector for the modulation imparted to the second beam, in that said means for modulating said first beam includes means for spatially filtering the one sideband beam from said first beam and photocathode means for detecting modulation upon said sideband beam.

* * * * *